United States Patent
Hara et al.

(10) Patent No.: US 11,037,066 B2
(45) Date of Patent: Jun. 15, 2021

(54) ESTIMATION OF ABNORMAL SENSORS

(71) Applicant: INTERNATIONAL BUSINESS MACHINES CORPORATION, Armonk, NY (US)

(72) Inventors: Satoshi Hara, Tokyo (JP); Takayuki Katsuki, Tokyo (JP); Hiroki Yanagisawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 15/208,941

(22) Filed: Jul. 13, 2016

(65) Prior Publication Data
US 2018/0018574 A1    Jan. 18, 2018

(51) Int. Cl.
   *G06N 7/00*    (2006.01)
   *G06N 5/04*    (2006.01)

(52) U.S. Cl.
   CPC ............ *G06N 7/005* (2013.01); *G06N 5/045* (2013.01)

(58) Field of Classification Search
   CPC . G06F 21/554; G06F 21/566; H04L 63/1416; H04L 63/1425; H04W 84/18; G06N 7/005; G06N 5/045; G06N 20/00; G06N 20/10; G06N 3/0472; G06N 3/08; G06N 3/088
   See application file for complete search history.

(56) References Cited

U.S. PATENT DOCUMENTS

| 9,075,713 B2 | 7/2015 | Jones et al. |
| 2012/0316835 A1 | 12/2012 | Maeda et al. |
| 2013/0024172 A1 | 1/2013 | Suyama et al. |

OTHER PUBLICATIONS

Franke et al., ORDEN: Outlier Region Detection and Exploration in Sensor Networks, Proceedings of the ACM SIGMOD International Conference on Management of Data, Jun. 2009. (Year: 2009).*
Bahrepour et al., Use of Event Detection Approaches for Outlier Detection in Wireless Sensor Networks, 2009 International Conference on Intelligent Sensors, Sensor Networks and Information Processing (ISSNIP), p. 439-444, Dec. 2009. (Year: 2009).*
Franke et al., Detection and Exploration of Outlier Regions in Sensor Data Streams, 2008 IEEE International Conference on Data Mining Workshops, Dec. 2008. (Year: 2008).*

(Continued)

*Primary Examiner* — Kamran Afshar
*Assistant Examiner* — Marshall L Werner
(74) *Attorney, Agent, or Firm* — Tutunjian & Bitetto, P.C.; Randall Bluestone

(57) ABSTRACT

Methods and apparatus are provided for estimating anomalous sensors. The apparatus includes a target data acquiring section to acquire a plurality of sets of target data serving as an examination target, each set of target data being output by a plurality of sensors. The apparatus further includes a calculating section to calculate, for each of a plurality of sensor groups such that each sensor group includes at least two sensors among the plurality of sensors, a degree of difference of a target data distribution of the plurality of sets of target data relative to a reference data distribution of output from the sensor group. The apparatus additionally includes an estimating section to estimate one or more sensors among the plurality of sensors to be a source of outlierness, based on a calculation result of the calculating section.

19 Claims, 7 Drawing Sheets

(56) References Cited

OTHER PUBLICATIONS

Bahrepour et al., Use of Event Detection Approaches for Outlier Detection in Wireless Sensor Networks, 2009 International Conference on Intelligent Sensors, Sensor Networks and Information Processing (ISSN 1P), p. 439-444, Dec. 2009. (Year: 2009).*

Martincic et al., Distributed Event Detection in Sensor Networks, 2006 International Conference on Systems and Networks Communications (ICSNC '06), Oct. 2006. (Year: 2006).*

Krishnamachari et al., Distributed Bayesian Algorithm for Fault-Tolerant Event Region Detection in Wireless Sensor Networks, IEEE Transactions on Computers, vol. 53, No. 3, pp. 241-250, Mar. 2004. (Year: 2004).*

Zhang et al., Outlier Detection Techniques for Wireless Sensor Networks: A Survey, IEEE Communications Surveys & Tutorials, vol. 12 issue 2, p. 159-170, Apr. 2010. (Year: 2010).*

Li et al., Differential Kullback-Leibler Divergence Based Anomaly Detection Scheme in Sensor Networks, 2012 IEEE 12th International Conference on Computer and Information Technology, p. 966-970, Dec. 2012. (Year: 2012).*

Osbourne et al., Real-Time Information Processing of Environmental Sensor Network Data Using Bayesian Gaussian Processes, ACM Transactions on Sensor Networks, vol. 9, No. 1, Article 1, Nov. 2012. (Year: 2012).*

* cited by examiner

US 11,037,066 B2

ESTIMATION OF ABNORMAL SENSORS

BACKGROUND

Technical Field

The present invention relates to estimation of anomalous sensors.

Description of the Related Art

A plurality of sensors come equipped in complex systems, such as automobiles or manufacturing apparatus. These sensors output time sequence data. The time sequence data are analyzed, and the presence of abnormalities in the sensors is monitored. A method for accurately detecting anomalous sensors from healthy sensors is needed.

SUMMARY

According to a first aspect of the present invention, provided is an apparatus including a target data acquiring section operable to acquire a plurality of sets of target data serving as an examination target, each set of target data output by a plurality of sensors; a calculating section operable to calculate, for each of a plurality of sensor groups that each include at least two sensors among the plurality of sensors, a degree of difference of a target data distribution of the plurality of sets of target data relative to a reference data distribution of output from the sensor group; and an estimating section operable to estimate one or more sensors among the plurality of sensors to be a source of outlierness, based on a calculation result of the calculating section. The first aspect may also include a system and a program for implementing the method performed by the apparatus.

The summary clause does not necessarily describe all features of the embodiments of the present invention. The present invention may also be a sub-combination of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figures 1, 2:
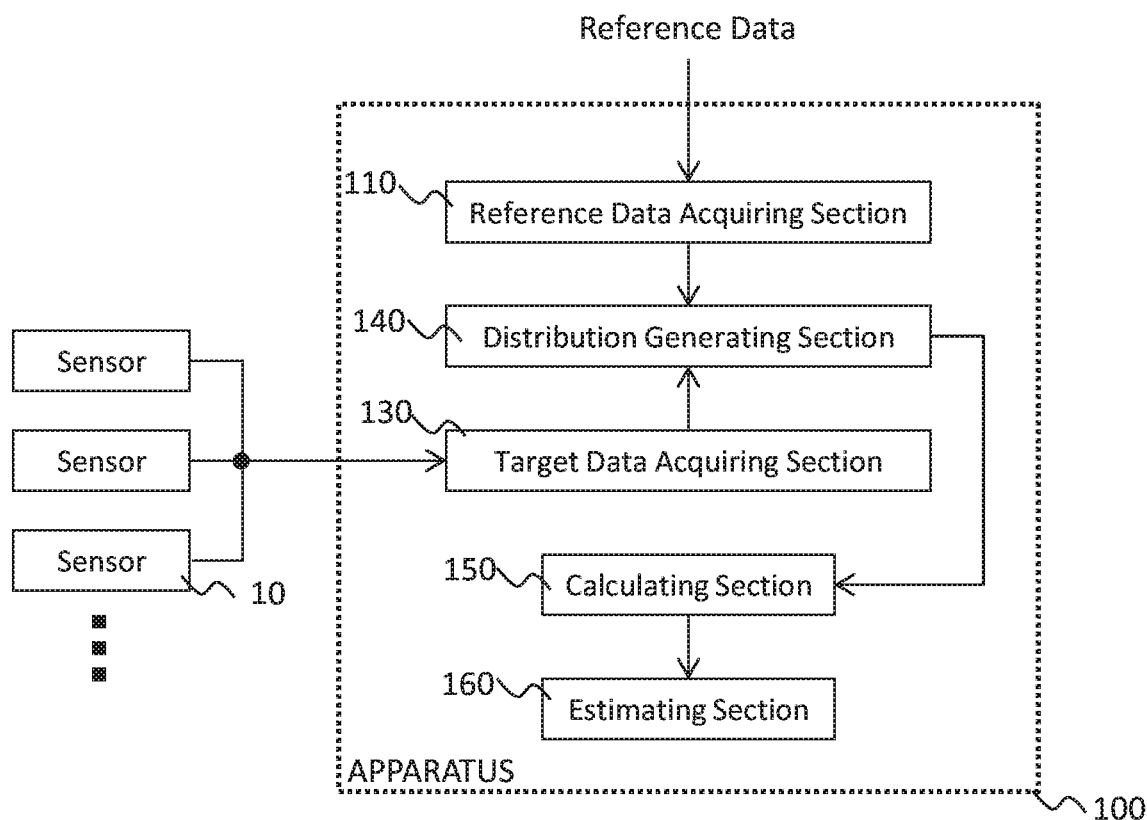
FIG. 1 shows an exemplary configuration of an apparatus along with a plurality of sensors 10, according to an embodiment of the present invention.
FIG. 2 shows sensors and sets of reference/target data according to an embodiment of the present invention.

FIG. 1 shows an exemplary configuration of an apparatus 100 along with a plurality of sensors 10, according to an embodiment of the present invention. The sensors 10 may be included with a target object, such as a transportation vehicle, e.g. an automobile, an airplane, a boat, etc., a manufacturing apparatus, a monitoring apparatus, etc., and may transfer detection results to the apparatus 100. The sensors 10 may be connected to the apparatus 100 through wires, or may be connected wirelessly.

The sensors 10 may be any type of sensor, such as temperature sensors, pressure sensors, position sensors, angle sensors, location sensors, fluid level sensors, rotational speed sensors, acceleration sensors, angular speed sensors, geomagnetic sensors, flow rate sensors, oxygen sensors, or the like. There can be any number of sensors 10, and in some embodiments there are more than a thousand sensors.

The apparatus 100 of the present embodiment acquires the output of the plurality of sensors 10, which may have a non-linear relationship among one another, and estimates one or more of anomalous sensors as a source of outlierness among the plurality of sensors 10. The apparatus 100 may comprise a processor and one or more computer readable mediums collectively including instructions. The instructions, when executed by the processor, may cause the processor to operate as a plurality of operating sections. Thereby, the apparatus 100 may be regarded as comprising a reference data acquiring section 110, a distribution generating section 140, a target data acquiring section 130, a calculating section 150, and an estimating section 160.

The reference data acquiring section 110 may be operable to acquire a plurality of sets of reference data serving as a reference for output of the plurality of sensors 10. The reference data acquiring section 110 may communicate with the sensors 10 and acquire, as the plurality of sets of the reference data, the output of the sensors 10 that are operating normally. The reference data may be initially stored in an external storage apparatus, such as a database, and the reference data acquiring section 110 may read the stored reference data.

The target data acquiring section 130 may be operable to acquire a plurality of sets of target data as an examination target. Each set of the target data is output by the plurality of sensors 10. The target data acquiring section 130 may communicate with the plurality of sensors 10 and acquire the target data. The target data acquiring section 130 may be connected to a network or the like, and acquire the target data via the network. The target data acquiring section 130 may read and acquire the target data stored in an external storage apparatus, such as a database. The target data acquiring section 130 may obtain each set of target data from the plurality of sensors 10 in real time.

The distribution generating section 140 may be operable to generate, for each of a plurality of sensor groups, a reference data distribution of the output from the sensor group. The distribution generating section 140 may communicate with the reference data acquiring section 110, receive the reference data of the sensors 10 in each sensor group, and generate a reference data distribution for each sensor group.

The distribution generating section 140 may also be operable to generate, for each of a plurality of sensor groups, a target data distribution of the output from the sensor group. The distribution generating section 140 may communicate with the target data acquiring section 130, receive the target data of the sensors 10 in each sensor group, and generate the target data distribution for each sensor group.

The distribution generating section 140 may form the plurality of sensor groups from among combinations of the plurality of sensors 10. In one embodiment, the distribution generating section 140 may form sets of a prescribed number of sensors 10 as sensor groups, and may generate the reference/target data distribution for each of these sensor groups. Each of the plurality of sensor groups may include at least two sensors 10 among the plurality of sensors 10. The distribution generating section 140 may generate the reference/target data distribution by using known distribution functions such as a normal distribution, a logistic distribution, a Poisson distribution, or a kernel function.

The calculating section 150 may be operable to calculate, for each of a plurality of sensor groups, a degree of difference of a target data distribution of the plurality of sets of target data relative to a reference data distribution of output from the sensor group. The calculating section 150 may calculate the degree of difference, for each sensor group including two sensors 10 among the plurality of sensors 10.

The calculating section 150 may communicate with the distribution generating section 140 and receive the reference data distribution and target data distribution. The calculating section 150 may read the reference data distribution and target data distribution from a memory, into which the distribution generating section 140 writes the reference data distribution and target data distribution.

The calculating section 150 may calculate the degree of difference based on the KL-divergence between the target data distribution and the reference data distribution. The detail of the calculation of the calculating section 150 is explained below.

The estimating section 160 may be operable to estimate one or more of sensors 10 among the plurality of sensors 10 to be a source of outlierness, based on a calculation result of the calculating section 150. The estimating section 160 may communicate with the calculating section 150 and receive the degree of differences for the plurality of sensor groups from the calculating section 150.

The estimating section 160 may calculate, for each sensor 10, a degree of association with which a sensor 10 is associated with the difference, from the at least two degrees of difference calculated for the sensor groups including the sensor 10. In one embodiment, the estimating section 160 may calculate the total or average of a plurality of degrees of difference calculated for all sensor groups (e.g., all pairs of sensors) including one sensor 10 as a degree of association of the one sensor. The estimating section 160 may estimate whether the sensor 10 is a source of outlierness based on the degree of association calculated for each sensor 10. The details of the estimation by the estimating section 160 is explained below.

The apparatus 100 according to the present embodiment calculates, for each sensor group, the degree of difference of the target data distribution and the reference data distribution acquired from the two or more sensors 10. For each sensor 10, the apparatus 100 calculates the degree of association of the sensor 10 from the plurality of degrees of difference corresponding to sensor groups including this sensor 10, and selects the sensors estimated to be sources of outlierness according to these degrees of association.

FIG. 2 shows sensors and sets of reference/target data according to an embodiment of the present invention. FIG. 2 shows a plurality of sensors including a sensor 1, a sensor 2, a sensor 3, and other sensors, which may correspond to the plurality of sensors 10. The plurality of sensors 10 may sequentially output reference/target data. In the embodiment of FIG. 2, the sensor 1 outputs a value of 4.1 in a first time point, a value of 5.5 in a second time point, a value of 6.5 in a third time point, a value of 3.1 in a fourth time point and so on, as reference/target data.

A set of target/reference data 20 may include a plurality of target/reference data from the plurality of sensors 10 (e.g., the sensor 1, the sensor 2, the sensor 3 and so on) in a time point (e.g., the first time point). A plurality of sets of target/reference data 20 may be output sequentially from the plurality of sensors 10 through a plurality of time points. A plurality of sets 20 of target/reference data may include a plurality of target/reference data from the plurality of sensors 10 in a plurality of time points (e.g., the first time point, the second time point, the third time point, and so on). In the embodiment of FIG. 2, a group of sensors 10 may include two sensors (e.g., the sensor 1 and the sensor 2). A target data acquiring section such as the target data acquiring section 130 may acquire the plurality of sets of target data output from the plurality of sensors 10 in a time period including a plurality of time points.

Figure 3:
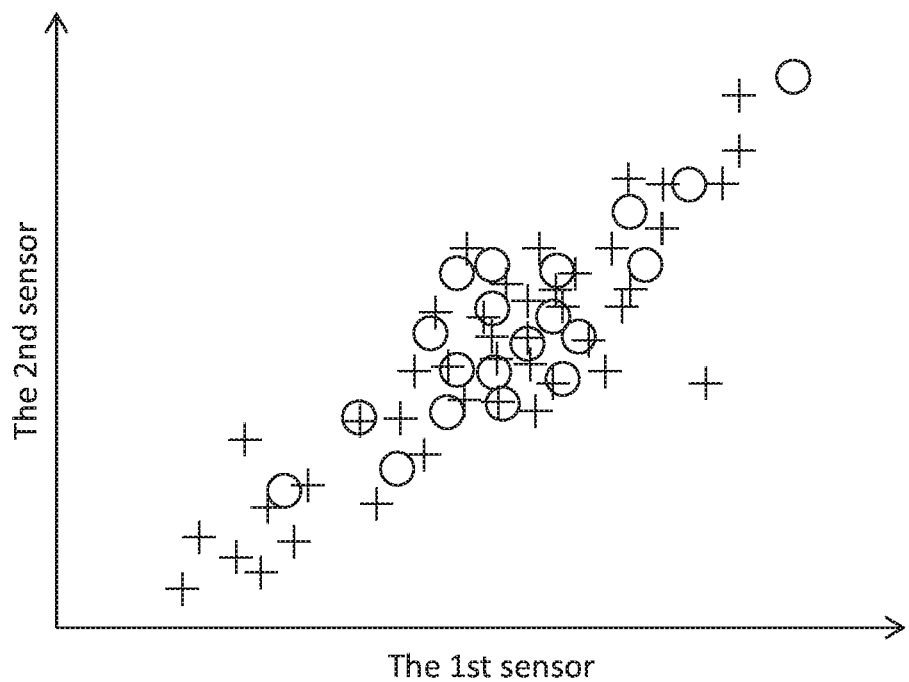
FIG. 3 shows a first example of a reference data distribution and target data, according to an embodiment of the present invention.

FIG. 3 shows a first example of a reference data distribution and a target data distribution, according to an embodiment of present invention. FIG. 3 shows an example in which a distribution generating section, such as the distribution generating section 140, expresses the reference data and the target data as two-dimensional coordinates, where output of one of the two sensors included in the sensor group is represented on the X axis and the output of the other sensor is represented on the Y axis. In other words, in FIG. 3, the horizontal axis (X axis) represents the data of a first sensor and the vertical axis (Y axis) represents the data of a second sensor. In the example of FIG. 3, the data indicated by a "+" symbol represents reference data for the sensor group of the first sensor and the second sensor, and data represented by a circular symbol represents the target data for the sensor group of the first sensor and the second sensor.

The distribution generating section may generate the reference data distribution based on the reference data of this sensor group. In other words, the distribution generating section may generate, as the reference data distribution, a distribution function in which the coordinate regions where more reference data is detected have larger values.

The distribution generating section may generate the target data distribution based on the target data of this sensor group. In other words, the distribution generating section may generate, as the target data distribution, a distribution function in which the coordinate regions where more target data is detected have larger values.

A calculating section, such as the calculating section 150, may calculate the degree of difference of this target data distribution from this reference data distribution. In the example of FIG. 3, the target data distribution generally overlaps with the reference data distribution, and therefore the calculating section may calculate the degree of difference to be a smaller value. In other words, the target data of the sensor group, i.e. the first sensor and the second sensor, is within a range of the reference data distribution acquired from the sensor group when operating normally, and therefore this sensor group can be estimated to be operating normally.

Figure 4:
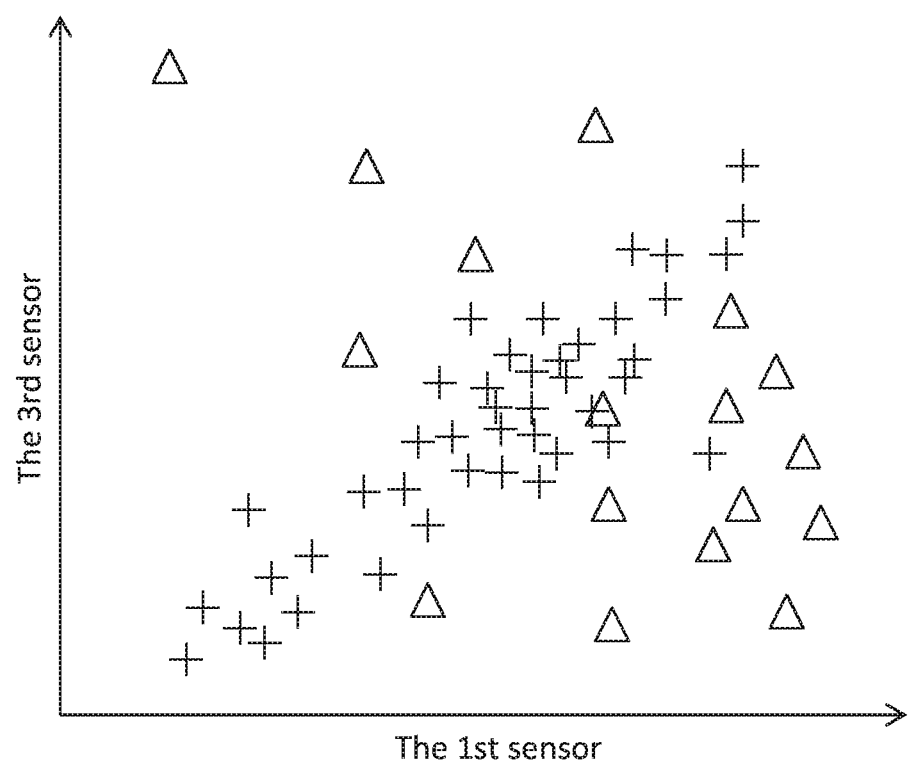
FIG. 4 shows a second example of a reference data distribution and target data, according to an embodiment of present invention.

FIG. 4 shows a second example of a reference data distribution and target data distribution, according to an embodiment of present invention. In the same manner as in FIG. 3, FIG. 4 shows an example in which the reference data and the target data are expressed as two-dimensional coordinates, where output of one of the two sensors included in the sensor group is represented on the X axis and the output of the other sensor is represented on the Y axis. In other words, in FIG. 4, the horizontal axis (X axis) represents the data of a first sensor and the vertical axis (Y axis) represents the data of a third sensor. In the example of FIG. 4, the data indicated by a "+" symbol represents reference data for the sensor group of the first sensor and the third sensor, and data represented by a triangular symbol represents the target data for the sensor group of the first sensor and the third sensor.

In the example of FIG. 4, the target data distribution is generally not overlapping with the reference data distribution, and therefore the calculating section may calculate the degree of difference to be larger than the value of the degree of difference calculated for the example of FIG. 3. In other words, the target data of the sensor group, i.e. the first sensor and the third sensor, is outside of the range of the reference data distribution acquired from the sensor group when operating normally, and therefore at least one sensor of the sensor group can be estimated as possibly operating abnormally.

In the manner described above, the distribution generating section of the present embodiment generates a reference data distribution that reflects a non-linear relational structure among the sensors, and the calculating section calculates the degree of difference of this target data distribution from this reference data distribution. Thus, the calculating section may calculate the degree of difference for each sensor group while reflecting the non-linear relational structure among the sensors. An apparatus, such as the apparatus 100, can calculate the degree of difference $L_{dd'}$ of a sensor group including a sensor d and sensor d' for all of the sensor groups by acquiring the reference data and target data from each of the sensors.

Figure 5:
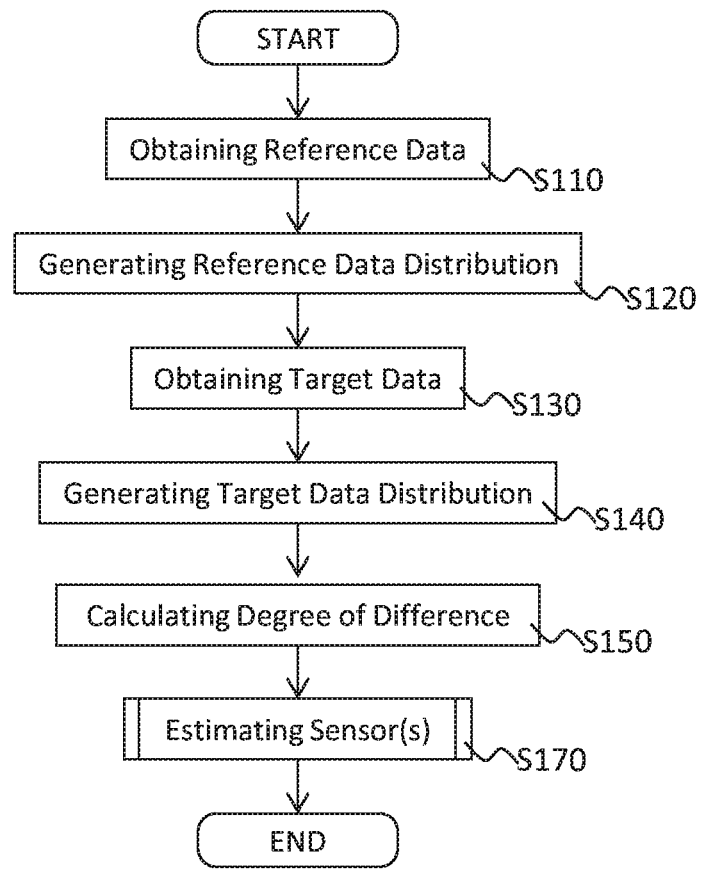
FIG. 5 shows an operational flow of an apparatus, according to an embodiment of the present invention.

FIG. 5 shows an operational flow of an apparatus, according to an embodiment of the present invention. The present embodiment describes an example in which an apparatus, such as the apparatus 100, performs the operations from S110 to S170, as shown in FIG. 5. The apparatus may estimate one or more of the sensors to be a source of outlierness by performing the operations of S110-S170. In the example shown in FIG. 5, the apparatus performs processing for sensor groups, each of which includes two sensors. In other embodiments, the apparatus performs processing for sensor groups, each of which includes three or more sensors. Hereinafter, the sensor group may be referred to as "pair of sensors."

At S110, a reference data acquiring section, such as the reference data acquiring section 110, may acquire a plurality of sets of the reference data. The reference data acquiring section may acquire, as the reference data, output occurring in a case where the plurality of sensors are operating normally, in a certain time period. The reference data acquiring section may acquire sets of output of the plurality of sensors. The reference data acquiring section may acquire each set of output of the plurality of sensors for each time point in the certain time period.

For example, the reference data acquiring section may acquire, as a plurality of sets of the reference data, a plurality of output data in a plurality of sequential or non-sequential time points occurring in a case where the target object on which the plurality of sensors are mounted has operated. Here, if the target object is a transportation vehicle, the reference data acquiring section may acquire, as the plurality of sets of the reference data, a plurality of the output data during a time period when the target object moves a prescribed distance or within a prescribed range.

Next, at S120 a distribution generating section, such as the distribution generating section 140, may form a pair of sensors from the plurality of sensors, and generate a reference data distribution for each pair of sensors. In other words, the distribution generating section may generate a reference data distribution for the two sensors in each group.

The distribution generating section may generate each reference data distribution for each pair of sensors in a two-dimensional coordinate system, where the output of one of the two sensors is expressed on the X axis and the output of the other sensor is expressed on the Y axis. If D reference data distributions are being generated for each sensor group of D sensors, then the distribution generating section may generate the reference data distributions in a D-dimensional coordinate system, where the reference data of the D sensors is expressed in a coordinate system with n dimensions.

In the embodiment of the operational flow of FIG. 5, an example where the distribution generating section generates bivariate distribution $p(x_d, x_{d'})$, as the reference data distribution, from a plurality of pairs of reference data $x_d$ and $x_{d'}$ from sensors d and d' is described below for the purpose of the illustration. Corresponding reference data $x_d$ and $x_{d'}$ may be included in the same set of reference data, which may be obtained at the same or corresponding time point. The distribution generating section may generate multivariate distribution with more than 2 reference data in some embodiments.

The distribution generating section may generate each reference data distribution $p(x_d, x_{d'})$ using at least one known distribution model, for example if the distribution model of the reference data distribution is known. The distribution generating section may generate each reference data distribution $p(x_d, x_{d'})$ by combining two or more known distribution models. Since the relational structure among outputs of the plurality of sensors may be a complex non-linear relationship, the distribution generating section preferably generates each of the reference data distributions $p(x_d, x_{d'})$ using a distribution function that can handle the non-linear relationship.

The distribution generating section may generate the reference data distribution $p(x_d, x_{d'})$ corresponding to such a non-linear relationship by using a kernel function (e.g. Gaussian kernel, Epanechnikov kernel, or Rectangular kernel) that is known as a kernel density estimation.

Alternatively, the distribution generating section may generate each of the reference data distributions $p(x_d, x_{d'})$ using a plurality of normal distributions. The distribution generating section may generate each of the reference data distributions $p(x_d, x_{d'})$ by combining a plurality of distribution functions. The distribution generating section may generate each of the reference data distributions $p(x_d, x_{d'})$ using one normal distribution, for example if shortened processing time is desired.

In one embodiment, if the distribution model of the reference data is estimated to be a Gaussian distribution, then the distribution generating section may calculate a mean value and a covariance value of the reference data of each pair of sensors (the sensors d and d') and generate the reference data distribution $p(x_d, x_{d'}; \omega_{dd'})$ as shown in the following formula (1):

$$p(x_d, x_{d'}; \omega_{dd'}) = N(x_d, x_{d'}; \mu_{dd'}^p, \Sigma_{dd'}^p), \omega_{dd'} = (\mu_{dd'}^p, \Sigma_{dd'}^p) \quad (1),$$

where $\mu^p_{dd'}$ represents a mean of the distribution, and $\Sigma^p_{dd'}$ represents a covariance of the distribution.

Instead of using a known distribution, the distribution generating section may generate the reference data distribution $p(x_d, x_{d'})$ based on each set of reference data from the pair of sensors, for example if the distribution model of the reference data distribution is not known. In one embodiment, the distribution generating section may generate the reference data distribution $p(x_d, x_{d'})$ based on the nearest neighbor algorithm. In the embodiment, the distribution generating section may generate the reference data distribution $p(x_d^{(n)}, x_{d'}^{(n)})$ by the following formula (2).

$$p(x_d^{(n)}, x_{d'}^{(n)}) := \min_{x' \in P\setminus\{x^{(n)}\}} \sqrt{(x_d^{(n)} - x'_d)^2 + (x_{d'}^{(n)} - x'_{d'})^2}, \quad (2)$$

where $P = \{x^n\}_{n=1}^N \sim$ i.i.d.,
N: a number of sets of the reference data The distribution generating section may generate the reference data distributions $p(x_d, x_{d'})$ corresponding to all of the pairs of sensors, i.e. all combinations of two sensors (e.g., d, d'∈D), among the plurality of sensors (e.g., D sensors). In one embodiment, if the number of sensors is D, the number of all combination is D(D−1)/2. The distribution generating section may store the generated reference data distributions in a memory of the apparatus.

Next at S130, a target data acquiring section, such as the target data acquiring section 130, may acquire a plurality of sets of the target data. The target data acquiring section may acquire, as the plurality of sets of the target data, the output of the plurality of sensors in a plurality of sequential time points. As an example, the target data acquiring section may acquire, as the target data, the output at a timing or during a time period when abnormalities may be detected during operation of the target object on which the plurality of sensors are mounted. Here, if the target object is a transportation vehicle, then the target data acquiring section may acquire, as the plurality of sets of the target data, a plurality of the output at the plurality of sequential time points during a time period when the target object is moving.

If the output during a time period when the target object moves a prescribed distance or within a prescribed range is acquired by the reference data acquiring section as the reference data, then the target data acquiring section may acquire, as the plurality of sets of the target data, a plurality of the output of the target object at a plurality of sequential time points during a time period when the target object again moves the prescribed distance or in the prescribed range.

In one embodiment, the apparatus may acquire in advance the plurality of sets of the reference data during a first period when the target object moves a prescribed amount, acquire the plurality of sets of the target data during a second period when the target object again moves the prescribed amount, and detect an abnormality of one or more of sensors during the second period based on the plurality of sets of the reference data and the plurality of sets of the target data.

Next at S140, the distribution generating section may generate a target data distribution for each sensor group. The distribution generating section may generate the target data distribution from the plurality of sets of target data for each sensor group in the same manner as the distribution generating section generates the reference data distribution for each sensor group from the plurality of sets of the reference data of each sensor group.

In the embodiment of the operational flow of FIG. 5, an example where the distribution generating section generates bivariate distribution $q(x_d, x_{d'})$, as the target data distribution, from a plurality of pairs of target data $x_d$ and $x_{d'}$ from sensors d and d' is described below for the purpose of the illustration. Corresponding target data $x_d$ and $x_{d'}$ may be included in the same set of target data, which may be obtained at the same or corresponding time point. The distribution generating section may generate multivariate distribution with more than 2 target data in some embodiments.

The distribution generating section may generate each target data distribution $q(x_d, x_{d'})$ using at least one known distribution model, for example if the distribution model of the target data distribution is known. The distribution generating section may generate each target data distribution $q(x_d, x_{d'})$ by combining two or more known distribution models.

The distribution generating section may generate the target data distribution $q(x_d, x_{d'})$ corresponding to such a non-linear relationship by using a kernel function (e.g. Gaussian kernel, Epanechnikov kernel, or Rectangular kernel) that is known as a kernel density estimation. Alternatively, the distribution generating section may generate each of the target data distributions $q(x_d, x_{d'})$ using a plurality of normal distributions. The distribution generating section may generate each of the target data distributions $q(x_d, x_{d'})$ by combining a plurality of distribution functions. The distribution generating section may generate each of the target data distributions $q(x_d, x_{d'})$ using one normal distribution, for example if shortened processing time is desired.

In one embodiment, if the distribution model of the target data is estimated to be Gaussian distribution, then the distribution generating section may calculate a mean value and a covariance value of the target data of each pair of sensors (the sensors d and d') and generate the target data distribution $q(x_d, x_{d'}; \eta_{dd'})$ as shown in the following formula (3):

$$q(x_d, x_{d'}; \eta_{dd'}) = N(x_d, x_{d'}; \mu_{dd'}^q, \Sigma_{dd'}^q), \eta_{dd'} = (\mu_{dd'}^q, \Sigma_{dd'}^q) \quad (3),$$

where $\mu^q_{dd'}$ represents a mean of the distribution, and $\Sigma^q_{dd'}$ represents a covariance of the distribution.

Instead of using a known distribution, the distribution generating section may generate the target data distribution $q(x_d, x_{d'})$ based on each set of target data from the pair of sensors, for example if the distribution model of the target data distribution is not known. In one embodiment, the distribution generating section may generate the target data distribution $q(x_d, x_{d'})$ based on the nearest neighbor algorithm. In the embodiment, the distribution generating section may generate the target data distribution $q(x_d^{(n)}, x_{d'}^{(n)})$ by the following formula (4).

$$q(x_d^{(n)}, x_{d'}^{(n)}) := \min_{y \in Q} \sqrt{(x_d^{(n)} - y_d)^2 + (x_{d'}^{(n)} - y_{d'})^2}, \quad (4)$$

where $Q=\{x^m\}_{m=1}^M$~i.i.d.,

M: a number of sets of the target data

The distribution generating section may generate the target data distributions $q(x_d, x_{d'})$ corresponding to all of the pair of sensors, i.e. all combinations of two sensors (e.g., d, d'∈D), among the plurality of sensors (e.g., D sensors). The distribution generating section may store the generated target data distributions in the memory of the apparatus.

Next at S150, a calculating section such as the calculating section 150 may calculate, for each pair of sensors (d, d'), a degree of difference $L_{dd'}$ of a target data distribution $q(x_d, x_{d'})$ to a reference data distribution $p(x_d, x_{d'})$. The calculating section may calculate, for each of the plurality of sensors, the degree of difference of each pair of sensors including the sensor. In one embodiment, the calculating section may calculate, for a sensor d, a degree of difference $L_{d1}$ for a pair of sensors (d, 1), a degree of difference $L_{d2}$ for a pair of sensors (d, 2), . . . , a degree of difference $L_{dD}$ for a pair of sensors (d, D). The degrees of difference $L_{ij}$ and $L_{ji}$ for a pair of sensors i and j are the same, and it is not necessary to calculate $L_{ii}$. Thereby the calculating section may calculate D(D−1)/2 degrees of differences for D(D−1)/2 pairs of sensors formed from D sensors.

In one embodiment, the calculating section may calculate the degree of difference $L_{dd'}$ by calculating the KL-divergence from a distribution model of the target data distribution $q(x_d, x_{d'})$ and a distribution model of the reference data distribution $p(x_d, x_{d'})$. In the embodiment, the calculating section may receive the reference data distribution $p(x_d, x_{d'}; \omega_{dd'})$ generated by the formula (1) at S120 and the target data distribution $q(x_d, x_{d'}; \omega_{dd'})$ generated by the formula (3) at S140 from the distribution generating section, directly or via the memory. The calculating section may calculate the degree of difference $L_{dd'}$ by the following formula (5):

$$L_{dd'} = D_{KL}[p(x_d, x_{d'}; \hat{\omega}_{dd'}) \| q(x_d, x_{d'}; \hat{\eta}_{dd'})] \qquad (5)$$

$$= \frac{1}{2}\left\{tr\left[\sum_{dd'}^{q^{-1}}\left(\sum_{dd'}^{p} + (\mu_{dd'}^q - \mu_{dd'}^p)(\mu_{dd'}^q - \mu_{dd'}^p)^T\right)\right] + \log\frac{\det\sum_{dd'}^q}{\det\sum_{dd'}^p}\right\} - 1$$

In one embodiment, the calculating section may calculate the degree of difference $L_{dd'}$ by calculating the KL-divergence between the target data distribution $q(x_d, x_{d'})$ and the reference data distribution $p(x_d, x_{d'})$ based on each set of target data from the pair of sensors (d, d') and each set of reference data from the pair of sensors (d, d'). The calculating section may calculate the degree of difference based on a method disclosed in Wang, Kulkarni, and Verdu, Divergence Estimation for Multidimensional Densities Via k-Nearest-Neighbor Distance, IEEE TRANSACTIONS ON INFORMATION THEORY, VOL. 55, NO. 5, MAY 2009: 2392-2405, which is hereby incorporated by reference in its entirety.

In the embodiment, the calculating section may receive the reference data distribution $p(x_d^{(n)}, x_{d'}^{(n)})$ generated by the formula (2) at S120 and the target data distribution $q(x_d^{(n)}, x_{d'}^{(n)})$ generated by the formula (4) at S140 from the distribution generating section, directly or via the memory. In the embodiment, the calculating section may calculate the degree of difference $L_{dd'}$ by the following formula (6):

$$L_{dd'} := \frac{2}{N}\sum_{n=1}^{N}\log\frac{q(x_d^{(n)}, x_{d'}^{(n)})}{p(x_d^{(n)}, x_{d'}^{(n)})} + \log\frac{M}{N-1} \qquad (6)$$

Next at S170, an estimating section such as the estimating section 160 may estimate a sensor among the plurality of sensors to be a source of outlierness, based on a calculation result of the calculating section at S150. The estimating section may receive the degrees of difference of each of the plurality of sensor groups from the calculating section, directly or via the memory of the apparatus, and may calculate, for each sensor, a degree of association with which a sensor is associated with the difference, from a plurality of degrees of difference calculated for the groups including the sensor. The estimating section may detect one or more sensors as sources of outlierness or an anomalous sensor. The details of the operation of S170 are explained in relation to FIGS. 6-10.

Figure 6:
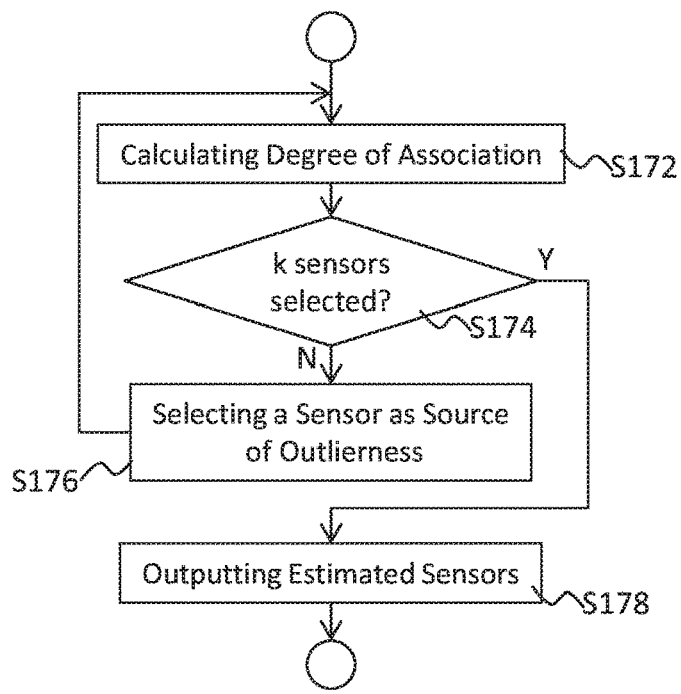
FIG. 6 shows an operational flow of the sensor estimation operation, according to an embodiment of the present invention.

FIG. 6 shows an operational flow of the sensor estimation operation, according to an embodiment of the present invention. The estimating section may perform the sensor estimation, such as the operation of S170, by performing operations of S172-S178.

At S172, the estimating section may calculate, for each sensor d (de K), a degree of association $A_d$ of a sensor d based on the plurality of degree of differences calculated for sensor groups including the sensor d. K represents a set of sensors, which initially includes all sensors (D sensors). In one embodiment, at the first operation of S172, the estimating section may calculate the degree of association $A_d$ by calculating a total or average of the degree of differences $L_{d1}, L_{d2}, \ldots L_{d(d-1)}, L_{d(d+1)}, \ldots, L_{dD}$ for sensor groups including the sensor d. The estimating section may calculate the degree of association $A_d$ for all sensors included in the set K.

The degree of association $A_d$ may represent a degree to which a sensor d is associated with the degree of differences with other sensors (e.g., a sensor 1, a sensor 2, . . . , a sensor d−1, a sensor d+1, . . . , a sensor D). If the degree of association $A_d$ for the sensor d is small, it may indicate that the target distributions of the sensor d and the other sensors are similar to the reference distributions of the sensor d and the other sensors, and thus it is likely that the sensor d is not a source of the outlierness. On the other hand, if the degree of association $A_d$ for the sensor d is large, it may indicate that the target distributions of the sensor d and the other sensors are not similar to the reference distributions of the sensor d and the other sensors, and thus it is likely that the sensor d is a source of the outlierness.

Next at S174, the estimating section may determine whether k sensors have been selected as the source of outlierness. A value k represents a preset number of anomalous sensors, and may be initially input by a user of the apparatus. It turns out that there are 3 anomalous sensors among a plurality of sensors, and so the user may input 3 as a value of k. If the estimating section has already selected k sensors as the source of outlierness at S176, then the estimating section may proceed with an operation of S178. Otherwise, the estimating section may proceed with an operation of S176.

At S176, the estimating section may select one sensor as a source of outlierness based on the degrees of association of sensors in the set K calculated at S172. In one embodiment, the estimating section may select a sensor that has the highest degree of association among sensors in the set K. In one embodiment, the estimating section may select a sensor further based on a comparison with a reference value. In the embodiment, the estimating section may estimate sensors having a degree of association that is greater than or equal to a reference value among sensors in the set K, and among the estimated sensors select a sensor that has the highest degree of association. In the embodiment, if there is no sensor having a degree of association greater than or equal to the reference value, then the estimating section may end the operation of S176 and proceed with S178.

The estimating section may initially receive the reference value from the user of the apparatus, or calculate the reference value based on the degrees of association of all sensors (e.g., an average of degrees of association of all sensors).

The estimating section may update the set K by eliminating the selected sensor from the set K, and go back to the operation of S172. At the second (and subsequent) operation of S172, the estimating section may calculate the degrees of associations for sensors in the updated set K.

At S178, the estimating section may output sensor(s) that are estimated as a source of outlierness at S176. In other words, the estimating section may output sensor(s) that are initially included in the set K but not included in the set K in the end. The estimating section may also output sensors that are not estimated as sources of outlierness at S176, and that are still included in the set K in the end, as healthy sensors. In one embodiment, the estimating section may output identification information of the anomalous/healthy sensors or display such information on the display of the apparatus.

As described above, during iterations (i.e., loops) of the operation of S172-S176, the estimating section may sequentially select a predetermined number (k) of sensors to be sources of outlierness. After selecting the predetermined number of sensors, the estimating section may end the selection of sensors to be source of outlierness and proceed with S178.

In other embodiments, the estimating section may sequentially select a predetermined number of sensors not to be sources of outlierness, in order of degree of association beginning with a sensor having a lowest degree of association in the operational flow of FIG. 6. In the embodiments, k may represent the number of healthy sensors. In the embodiment, the estimating section may select a sensor having the lowest degree of association among sensors in the set K, as a healthy sensor, at each iteration of S176, and output sensors selected at S176 as healthy sensors at the operation of S178.

In other embodiments, the estimating section may calculate degrees of association of all sensors (i.e., D sensors), and estimate each sensor having a degree of association that is greater than or equal to a reference value as a source of outlierness, instead of performing the operational flow of FIG. 6.

Figure 7:
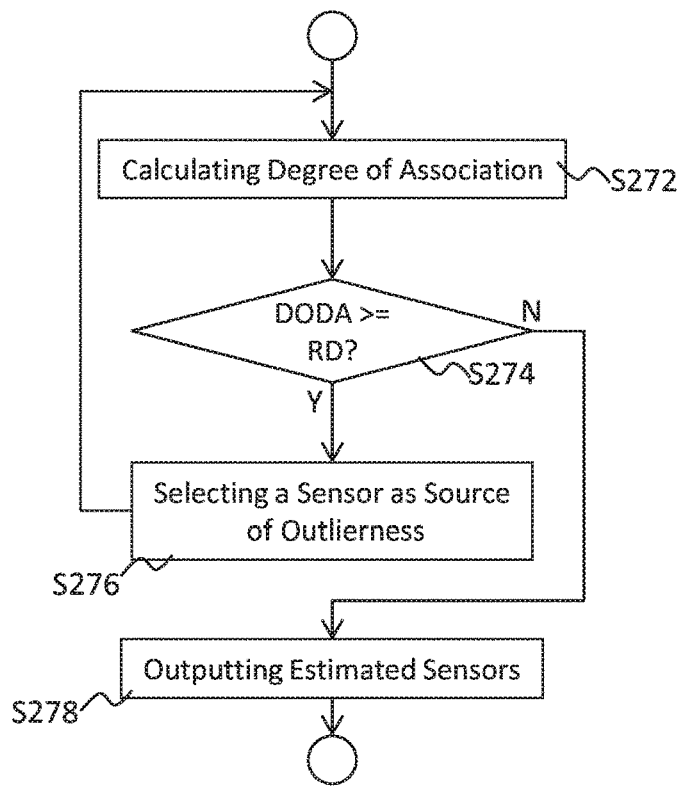
FIG. 7 shows another operational flow of the sensor estimation operation, according to an embodiment of the present invention.

FIG. 7 shows another operational flow of the sensor estimation operation, according to an embodiment of the present invention. The estimating section may perform the sensor estimation operation, such as the operation of S170, by performing operations of S272-S278.

At S272, the estimating section may calculate, for each sensor d (d∈K), a degree of association $A_d$ of a sensor d based on the plurality of degree of differences calculated for sensor groups including the sensor d. The estimating section may perform the operation of S272 in the same manner as S172.

At S274, the estimating section may determine whether a difference between the degree of association of the most recently selected sensor and the next highest degree of association is greater than or equal to a reference difference. In other words, at the i-th iteration of a loop of S272-S276, the estimating section may determine whether a difference between the degree of association of the sensor selected at the (i−1)-th iteration and the degree of association of a sensor having the highest degree of association among sensors in the set K at the i-th iteration is greater than or equal to the reference difference. The estimating section may initially input the reference difference by a user or calculate the reference difference based on the degrees of difference of all sensor groups. If the difference is greater than or equal to the reference difference, then the estimating section may proceed with an operation of S276. Otherwise, the estimating section may proceed with an operation of S278.

At S276, the estimating section may select one sensor as a source of outlierness based on the degrees of association of sensors in the set K calculated at S272. In one embodiment, the estimating section may select a sensor that has the highest degree of association among sensors in the set K. In one embodiment, the estimating section may select a sensor further based on a comparison with a reference value in the same manner with the embodiments explained in relation to S176.

The estimating section may update the set K by deleting the selected sensor from the set K, and then return to the operation of S272. At the second (and subsequent) operation of S272, the estimating section may calculate the degrees of associations for sensors in the updated set K.

At S278, the estimating section may output sensors that are estimated as a source of outlierness at S276. In other words, the estimating section may output sensors that are initially included in the set K but not included in the set K in the end. The estimating section may also output sensors that are not estimated as a source of outlierness at S276, and that are still included in the set K in the end, as healthy sensors. In one embodiment, the estimating section may output identification information of the anomalous/heathy sensors, or display such information on the display of the apparatus.

As described above, the estimating section may sequentially select sensors to be sources of outlierness, in order of degree of association beginning with a sensor having the highest degree of association during iterations of the operation of S272-S276, and may estimate that sensors that have not yet been selected are not sources of outlierness, if a difference between the degree of association of the most recently selected sensor and the next highest degree of association is greater than or equal to a reference difference.

In other embodiments, the estimating section may sequentially select sensors not to be sources of outlierness, in order of degree of association beginning with a sensor having the lowest degree of association, such as in the operational flow of FIG. 6. In the embodiments, k may represent the number of healthy sensors. In the embodiment, the estimating section may select a sensor having the lowest degree of association among sensors in the set K, as a healthy sensor, at each iteration of S276. The estimating section may estimate that sensors that have not yet been selected at S276 are sources of outlierness, if the estimating section determines that a difference between the degree of association of the most recently selected sensor and a next lowest degree of association of is greater than or equal to a reference difference at S274. The estimating section may output sensors selected at S276 as healthy sensors at the operation of S278.

Figure 8:
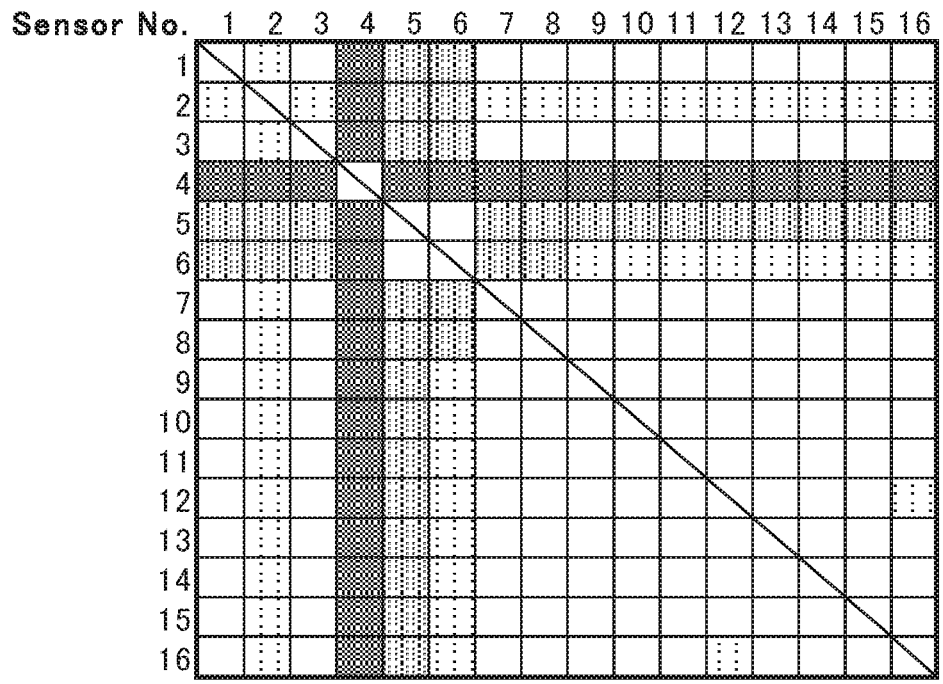
FIG. 8 shows an example in which the degree of difference of a sensor group is arranged in a matrix, according to an embodiment of present invention.

FIG. 8 shows an example in which the degree of difference $D_{ij}$ of a sensor group is arranged in a matrix with i rows and j columns, according to an embodiment of present invention. FIG. 8 shows an example in which the degrees of difference $D_{ij}$ of 16 sensors are represented by the shading amount in a pattern of squares in i rows and j columns. In FIG. 8, all of the squares in the fourth column and fourth row are shown with a darker pattern than the other squares, and this indicates an example in which the degree of difference $D_{4j}$ ($D_{i4}$) is a larger value than the other degrees of difference. In other words, among the plurality of sensor groups, the degrees of difference of the sensor groups that include the fourth sensor exhibit a larger value than the degrees of difference of the other sensor groups. Therefore, it can be estimated that the fourth sensor is an anomalous sensor.

As shown in FIG. 8, an estimating section, such as the estimating section 160, has calculated and arranged the degree of difference $D_{ij}$ in a matrix at the operation of S150. The estimating section may calculate, as each degree of association Ai, the sum $\Sigma_j D_{ij}$ of the degree of difference $D_{ij}$ for each column of a matrix such as shown in FIG. 8. Alternatively or in addition, the estimating section may calculate, as each degree of association $A_j$, the sum $\Sigma_i D_{ij}$ of the degree of difference $D_{ij}$ for each row of a matrix such as shown in FIG. 8.

The estimating section may select a sensor that has the largest degree of association as a source of outlierness at the operation of S176 or S276 at the first iteration of S172-S178 or S272-S278. In other words, the estimating section may select, as an anomalous sensor, a j-th sensor having the highest value for $\Sigma_i D_{ij}$, as the estimation result. Specifically, in the example of FIG. 8, the estimating section may estimate the fourth sensor to be an anomalous sensor, according to the sum $\Sigma_i D_{i4}$ of the degree of difference, which corresponds to the fourth column, having the largest value. The estimating section may delete the fourth sensor from the set K and thereby reduce the size of the matrix by removing the data in the fourth column and fourth row indicating the degree of difference of the fourth sensor, and perform an estimation of the next anomalous sensor at a next iteration of S172-S178 or S272-S278.

Figure 9:
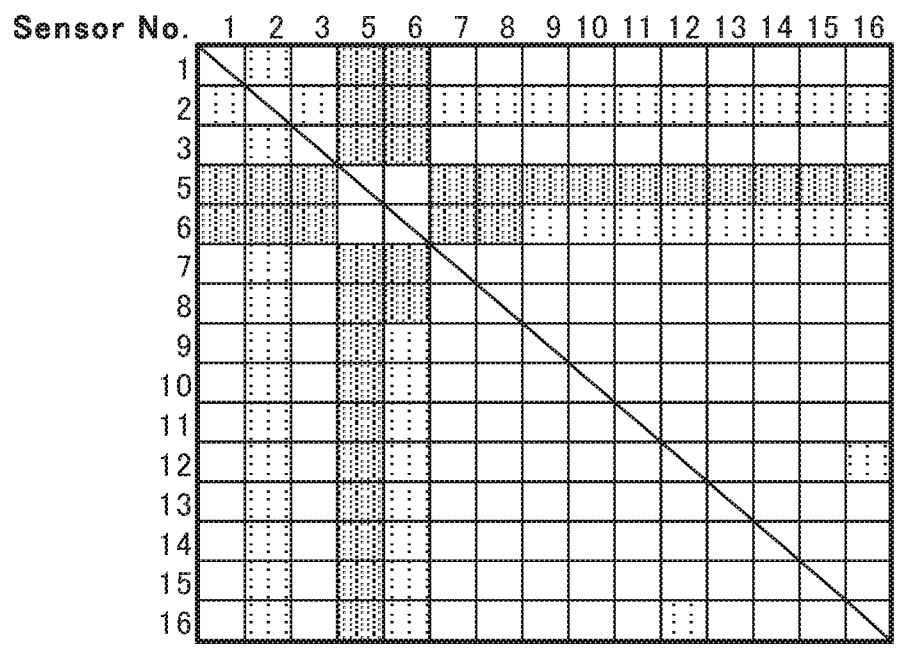
FIG. 9 shows an example of a matrix generated by removing the data in the column and row of the sensor estimated to be an abnormal sensor, according to an embodiment of present invention has estimated.

FIG. 9 shows an example of a matrix generated by removing the data in the column and row of the sensor estimated to be an anomalous sensor, according to an embodiment of present invention. The estimating section may be operable to calculate the degree of association with which each sensor is associated with difference, from the degree of difference calculated for sensor groups that do not include the sensors already selected as sensors that are sources of outlierness. The estimating section may perform a subsequent estimation from the matrix shown in FIG. 9 having 15 columns and 15 rows, which is obtained by removing the target data of the sensor groups including the fourth sensor.

Specifically, in the example of FIG. 9, the estimating section may estimate the fifth sensor to be an anomalous sensor, according to the sum $\Sigma_i \Gamma_{i5}$ of the degree of difference of the fourth column having the largest value, at the operation of S176 or S276 at the second iteration of S172-S178 or S272-S278. The estimating section may delete fifth sensor from the set K, then reduce the size of the matrix by removing the data in the fourth column and fourth row indicating the degree of difference of the fifth sensor, and perform an estimation of the next anomalous sensor.

Figures 10, 11:
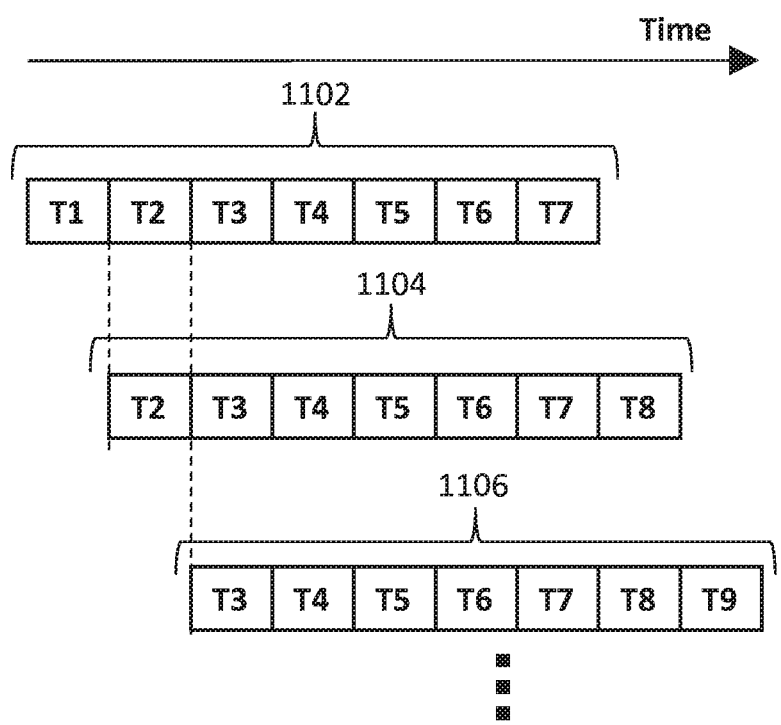
FIG. 10 shows another example of a matrix generated by removing the data in the column and row of the sensor estimated to be an abnormal sensor, according to an embodiment of present invention.
FIG. 11 shows an example of time periods in which the plurality of sensors output the target data.

FIG. 10 shows another example of a matrix generated by removing the data in the column and row of the sensor estimated to be an anomalous sensor, according to an embodiment of present invention. The estimating section may perform the subsequent estimation from the matrix shown in FIG. 10 having 14 columns and 14 rows, which is obtained by removing the degrees of difference of the sensor groups including any one of the fourth sensor and the fifth sensor.

As explained in relation to FIGS. 8-10, the estimating section may calculate, for each sensor that has not been selected (and thus is still included in the set K), the degree of association from the degrees of difference calculated for sensor groups that do not includes sensors that have already been selected (and thus is no longer included in the set K). The estimating section may determine whether to further select a sensor, based on a total or an average of the degrees of difference calculated for sensor groups that do not include sensors that have already been selected.

FIG. 11 shows an example of time periods in which the plurality of sensors output the target data. In one embodiment, the plurality of sensors output the target data in a time period 1102. The time period 1102 may include a plurality of sequential time points (e.g., T1, T2, . . . , T7 as shown in FIG. 11), and each sensor may output target data in each time point. The target data acquiring section may acquire sequences of the plurality of sets of target data output from the plurality of sensors in the time period 1102.

The target data acquiring section may also acquire sequences of the plurality of sets of target data output from the plurality of sensors in a time period 1104 including time points T2, T3, . . . , T8 and sequences of the plurality of sets of target data output from the plurality of sensors in a time period 1106 including time points T3, T4, . . . , T9. The time periods 1102 and 1104 are overlapping between time points T2 and T7, and the time periods 1104 and 1106 are overlapping between time points T3 and T8. Therefore, the target data acquiring section may acquire two or more sequences of the plurality of sets of target data output from the plurality of sensors in two or more overlapping time periods (e.g., the time periods 1102, 1104, 1106).

The calculating section may calculate the degree of difference for each of the two or more sequences of the plurality of sets of target data output in the time periods 1102, 1104, and 1106. The estimating section may estimate the sensor to be a source of outlierness based on the calculation result for each of the two or more sequences of the plurality of sets of target data output in the time periods 1102, 1104, and 1106. Thereby, the apparatus may process the plurality of sets of target data by a sliding window, and estimate anomalous sensors in real time based on the latest set of the target data.

In other embodiment, the target data acquiring section may acquire two or more sequences of the plurality of sets of target data output from the plurality of sensors in two or more not-overlapping time periods. In one embodiment, a length of each time period may be variable. For example, if the estimating section may estimate anomalous sensors, then the target data acquiring section may increase a number of time points included in each time period. Thereby, the apparatus may accurately determine whether the estimated anomalous sensor is actually anomalous.

As described above, the apparatus of the embodiments may estimate the anomalous sensors based on the degree of difference between the reference data distributions of the sensor groups and the target data distribution of the sensor groups. The apparatus may generate the reference/target data distributions of the sensor groups according to a complex non-linear relationship among the sensors, and therefore can perform an estimation in accordance with the actual operation of the plurality of sensors. Even if it is assumed that the relational structure among the sensors is linear, then such a case would correspond to the reference/target data distributions of the sensor groups having a linear relationship. Accordingly, in cases where the distribution generating section may generate the reference/target data distributions of the sensor as one normal distribution, the estimating section can perform the estimation more accurately than in cases where it is assumed that the relational structure among the sensors is linear.

Figure 12:
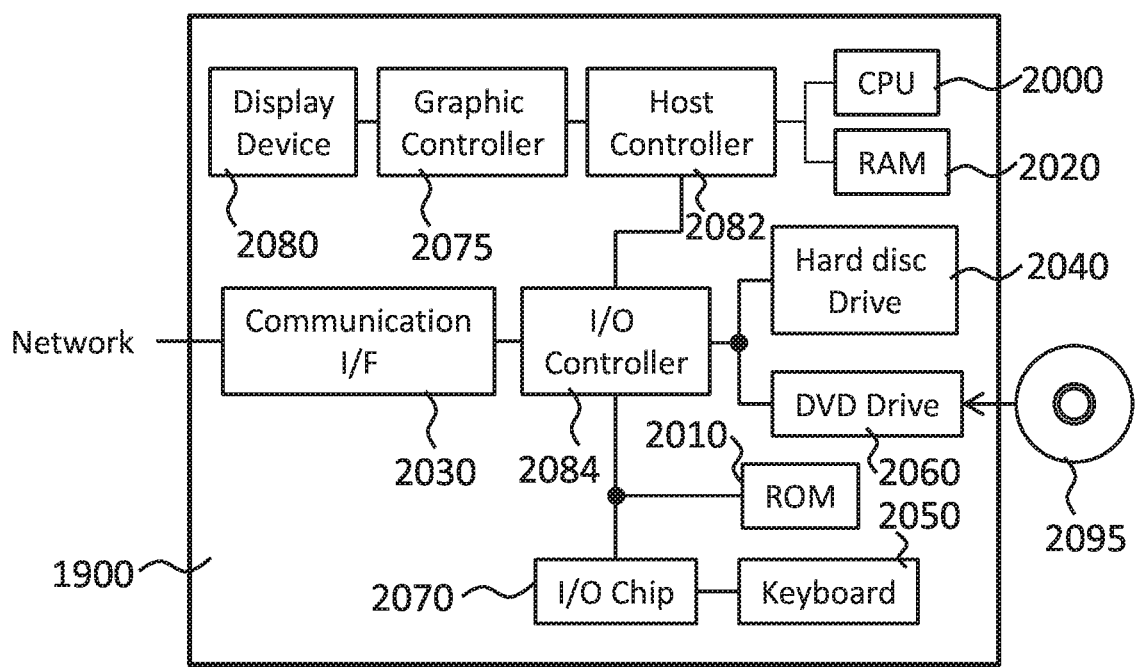
FIG. 12 shows an exemplary hardware configuration of a computer that functions as a system, according to an embodiment of the present invention.

FIG. 12 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as apparatus 100 of FIG. 1, includes a reference data acquiring section, a distribution generating section, a target data acquiring section, a calculating section, an estimating section. The program or module acts on the CPU 2000, to cause the computer 1900 to function as a reference data acquiring section, a distribution generating section, a target data acquiring section, a calculating section, an estimating section, such as the reference data acquiring section 110, the target data acquiring section 130, the distribution generating section 140, the calculating section 150, the estimating section 160, described above.

The information processing described in these programs is read into the computer 1900, to function as a reference data acquiring section, a distribution generating section, a target data acquiring section, a calculating section, an estimating section, which are the result of cooperation between the program or module and the above-mentioned various types of hardware resources. Moreover, the apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An apparatus including a processor and one or more computer readable media, the one or more computer readable media having thereon a plurality of operating sections and the processor adapted to execute operating sections of the plurality of operating sections, the plurality of operating sections comprising:
   a reference data acquiring section acquires reference data serving as a reference, the reference data being output data of sensors operating under normal conditions;
   a target data acquiring section acquires a plurality of sets of target data serving as an examination target, each set of target data output by a plurality of sensors in real-time;
   a calculating section calculates, for each of a plurality of sensor groups such that each sensor group includes at least two sensors among the plurality of sensors, a degree of difference of a target data distribution of the target data from each sensor group relative to a reference data distribution of output from the each sensor group, the reference data distribution being a Gaussian distribution such that the calculating section calculates a mean value and a covariance value of the reference data of each pair of sensors for each of the plurality of sensor groups; and
   an estimating section estimates, for each sensor, a degree of association of the sensor from a plurality of degrees of difference corresponding to sensor groups which include the sensor and estimates whether the sensor is a source of outlierness based on the degree of association estimated for the sensor,
   wherein the reference data and the plurality of sets of target data are each expressed as two-dimensional coordinates in the reference data distribution and the target data distribution, respectively, and the reference and target data distributions are displayed in an overlapping manner on a common graph, and
   wherein the reference data distribution is generated by:

$$p(x_d, x_{d'}; \omega_{dd'}) = N(x_d, x_{d'}; \mu_{dd'}^P, \Sigma_{dd'}^P), \omega_{dd'} = (\mu_{dd'}^P, \Sigma_{dd'}^P)$$

where $\mu_{dd'}^P$ represents a mean of the distribution, $\Sigma_{dd'}^P$ represents a covariance of the distribution, and $x_d$ and $x_{d'}$ is a pair of reference data.

2. The apparatus according to claim 1, wherein the degree of difference is based on a KL-divergence between the target data distribution and the reference data distribution.

3. The apparatus according to claim 2, wherein the calculating section further calculates a KL-divergence from a distribution model of the target data distribution and a distribution model of the reference data distribution.

4. The apparatus according to claim 2, wherein the calculating section further estimates a KL-divergence between the target data distribution and the reference data distribution based on the each set of target data from the sensor group and each set of reference data from the sensor group.

5. The apparatus according to claim 1, wherein the plurality of sets of target data is output sequentially from the plurality of sensors.

6. The apparatus according to claim 5, wherein the target data acquiring section further acquires the plurality of sets of target data output from the plurality of sensors in a time period.

7. The apparatus according to claim 6, wherein:
   the target data acquiring section acquires two or more sequences of the plurality of sets of target data output from the plurality of sensors in two or more overlapping time periods;
   the calculating section calculates the degree of difference for each of the two or more sequences of the plurality of sets of target data; and
   the estimating section estimates one or more of sensors to be a source of outlierness based on the calculation result for each of the two or more sequences of the plurality of sets of target data.

8. The apparatus according to claim 1, wherein the estimating section estimates each sensor having a degree of association that is greater than or equal to a reference value.

9. The apparatus according to claim 1, wherein the estimating section:
   sequentially selects sensors to be sources of outlierness, in order of degree of association beginning with a sensor having the highest degree of association; and
   estimates that sensors that have not yet been selected are not sources of outlierness, if a difference between the degree of association of the most recently selected sensor and the next highest degree of association is greater than or equal to a reference difference.

10. The apparatus according to claim 9, wherein:
the estimating section determines whether to further select a sensor, based on a total or an average of the degrees of difference calculated for sensor groups that do not include sensors that have already been selected.

11. The apparatus according to claim 9, wherein:
the estimating section estimates, for each of the sensors that have not yet been selected, the degree of association from the degrees of difference calculated for sensor groups that do not includes sensors that have already been selected.

12. The apparatus according to claim 1, wherein the estimating section sequentially selects a predetermined number of sensors to be sources of outlierness.

13. The apparatus according to claim 1, wherein the estimating section:
sequentially selects sensors to not be sources of outlierness, in order of degree of association beginning with a sensor having the lowest degree of association; and
estimates that sensors that have not yet been selected are sources of outlierness, if a difference between the degree of association of the most recently selected sensor and a next lowest degree of association is greater than or equal to a reference difference.

14. The apparatus according to claim 13, wherein the estimating section estimates, for each sensor that has not been selected, the degree of association from the degrees of difference calculated for sensor groups that do not include sensors that have already been selected.

15. The apparatus according to claim 1, wherein the estimating section sequentially selects a predetermined number of sensors not to be sources of outlierness, in order of degree of association beginning with a sensor having a lowest degree of association.

16. The apparatus according to claim 1, further comprising:
a reference data acquiring section acquires a plurality of sets of reference data serving as a reference for output of the plurality of sensors; and
a distribution generating section generates, for each of the plurality of sensor groups, the reference data distribution of output from the sensor group.

17. The apparatus according to claim 1, wherein the calculating section calculates the degree of difference for each sensor group including two sensors among the plurality of sensors.

18. A method comprising:
acquiring reference data serving as a reference, the reference data being output data of sensors operating under normal conditions;
acquiring a plurality of sets of target data serving as an examination target, each set of target data output by a plurality of sensors in real-time;
calculating, for each of a plurality of sensor groups such that each sensor group includes at least two sensors among the plurality of sensors, a degree of difference of a target data distribution of the target data from each sensor group relative to a reference data distribution of output from the each sensor group, the reference data distribution being a Gaussian distribution such that the calculating section calculates a mean value and a covariance value of the reference data of each pair of sensors for each of the plurality of sensor groups; and
estimating, for each sensor, a degree of association of the sensor from a plurality of degrees of difference corresponding to sensor groups which include the sensor and estimating whether the sensor is a source of outlierness based on the degree of association estimated for the sensor,
wherein the reference data and the plurality of sets of target data are each expressed as two-dimensional coordinates in the reference data distribution and the target data distribution, respectively, and the reference and target data distributions are displayed in an overlapping manner on a common graph, and
wherein the reference data distribution is generated by:

$$p(x_d, x_{d'}; \omega_{dd'}) = N(x_d, x_{d'}; \mu_{dd'}^P, \Sigma_{dd'}^P), \omega_{dd'} = (\mu_{dd'}^P, \Sigma_{dd'}^P)$$

where $\mu_{dd'}^P$ represents a mean of the distribution, $\Sigma_{dd'}^P$ represents a covariance of the distribution, and $x_d$ and $x_{d'}$ is a pair of reference data.

19. A computer program product comprising a computer readable storage medium having program instructions embodied therewith, the program instructions executable by a computer to cause the computer to perform operations comprising:
acquiring reference data serving as a reference, the reference data being output data of sensors operating under normal conditions;
acquiring a plurality of sets of target data serving as an examination target, each set of target data output by a plurality of sensors in real-time;
calculating, for each of a plurality of sensor groups such that each sensor group includes at least two sensors among the plurality of sensors, a degree of difference of a target data distribution of the plurality of sets of target data from each sensor group relative to a reference data distribution of output from the each sensor group, the reference data distribution being a Gaussian distribution such that the calculating section calculates a mean value and a covariance value of the reference data of each pair of sensors for each of the plurality of sensor groups; and
estimating, for each sensor, a degree of association of the sensor from a plurality of degrees of difference corresponding to sensor groups which include the sensor and estimating whether the sensor is a source of outlierness based on the degree of association estimated for the sensor,
wherein the reference data and the plurality of sets of target data are each expressed as two-dimensional coordinates in the reference data distribution and the target data distribution, respectively, and the reference and target data distributions are displayed in an overlapping manner on a common graph, and
wherein the reference data distribution is generated by:

$$p(x_d, x_{d'}; \omega_{dd'}) = N(x_d, x_{d'}; \mu_{dd'}^P, \Sigma_{dd'}^P), \omega_{dd'} = (\mu_{dd'}^P, \Sigma_{dd'}^P)$$

where $\mu_{dd'}^P$ represents a mean of the distribution, $\Sigma_{dd'}^P$ represents a covariance of the distribution, and $x_d$ and $x_{d'}$ is a pair of reference data.

* * * * *